Figure 1:
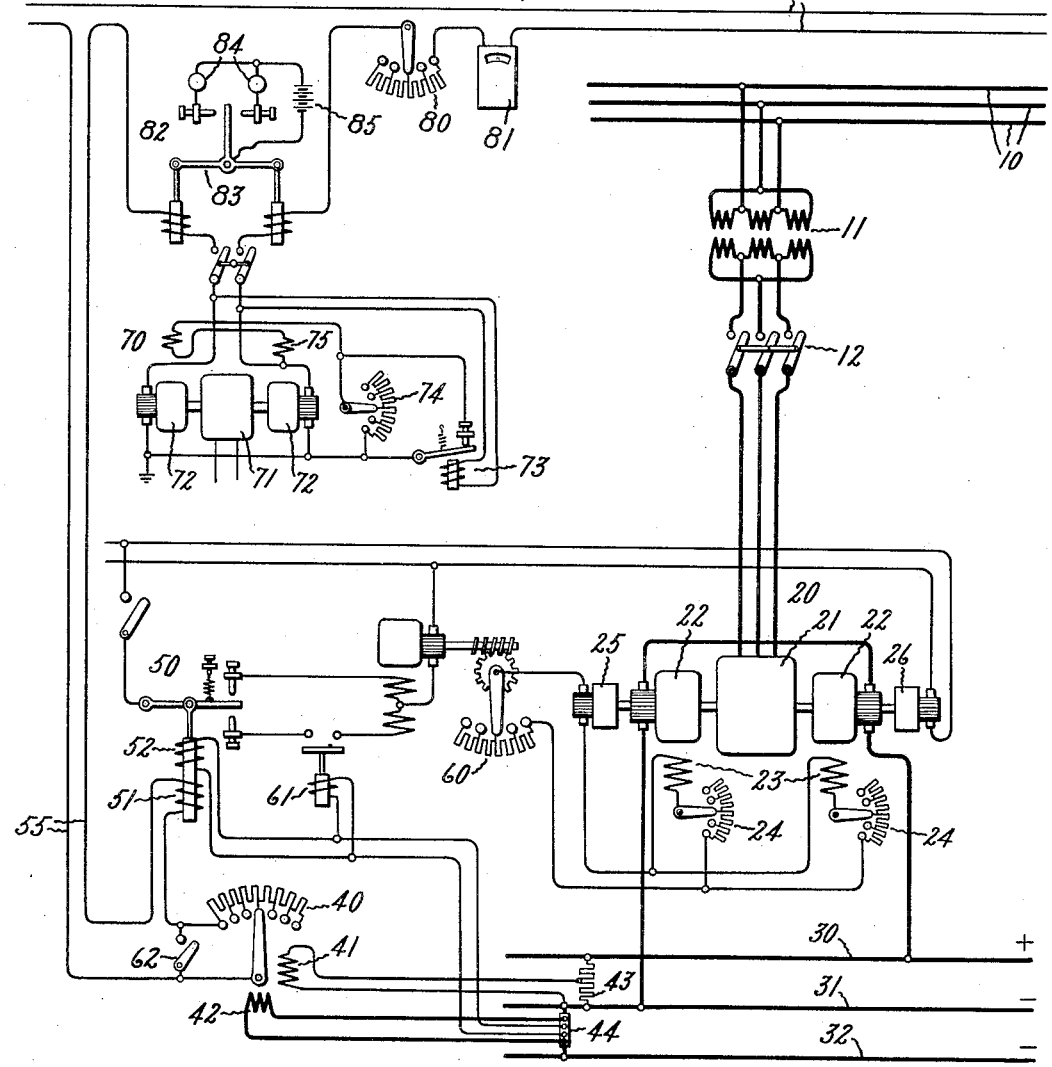

J. B. TAYLOR.
POWER INDICATING AND LIMITING SYSTEM.
APPLICATION FILED OCT. 27, 1914.

1,260,094.

Patented Mar. 19, 1918.

Witnesses:

Inventor:
John B. Taylor,
by
His Attorney.

UNITED STATES PATENT OFFICE.

JOHN B. TAYLOR, OF SCHENECTADY, NEW YORK, ASSIGNOR TO GENERAL ELECTRIC COMPANY, A CORPORATION OF NEW YORK.

POWER INDICATING AND LIMITING SYSTEM.

1,260,094. Specification of Letters Patent. Patented Mar. 19, 1918.

Application filed October 27, 1914. Serial No. 868,901.

*To all whom it may concern:*

Be it known that I, JOHN B. TAYLOR, a citizen of the United States, residing at Schenectady, county of Schenectady, State of New York, have invented certain new and useful Improvements in Power Indicating and Limiting Systems, of which the following is a specification.

My invention relates to means for indicating and limiting the power supplied to a distribution system, and more especially to the application of such a device to associated systems wherein power is supplied by a plurality of sources to direct current distribution systems.

My invention will have especial application to direct current railway systems to which power is supplied by a plurality of sources, and in this case the distribution networks supplied by the various sources will usually, though not necessarily, be inter-connected. Under such circumstances the charges for power are often determined by the maximum demand, and it is, therefore, important to provide some means whereby the total power being supplied to the system at any one time may be determined and controlled. In case any source supplies other distribution systems than the one in question, it is essential that the power limiting system be so designed that the method of controlling the demand for power shall not affect the main sources of energy or any other translating devices being supplied therefrom, and that the power indicating arrangement shall be responsive only to the power delivered to the railway distribution systems in question. Obviously, it may be that each source supplies power only to the distribution systems in question, or it may be that some of the sources supply alternating current power to various distribution systems, and that the particular supply of direct current power in question is obtained through a sub-station containing suitable transforming apparatus. In the latter case the term "source," as used in the specification and claims, will refer to the source of direct current in the sub-station, and not to the main or primary source. I shall herein describe one particular arrangement of apparatus embodying my invention wherein alternating current power is supplied from main sources and transformed to direct current at corresponding sub-stations, which thereupon constitute the "sources" of direct current.

The object of my invention, then, is to provide a simple, reliable, and convenient system, whereby it will be possible to indicate, at some desired place, the total power being simultaneously supplied by a plurality of sources of electrical energy to related distribution systems, and also to limit, both automatically and manually, the total demand of said systems on these sources.

When my invention is applied to a railway system wherein power is supplied from a plurality of sources to an inter-connected system of conductors, it should be noted that the location of the load will be constantly changing, and it is, therefore, desirable that the automatic means for limiting the total demand of such a system shall be so arranged that its effect will be felt more quickly on the source proximate to the heaviest load, and less quickly on the source near the lighter loads. Accordingly, another object of my invention is to devise an arrangement whereby this result is attained in connection with those previously mentioned.

In general, my system comprises a pilot wire circuit connecting the various direct current sources, which will be led to any particular point at which it is desirable that the total demand shall be indicated, and in its preferred form comprises a closed circuit with a constant voltage applied thereto. Associated with each source, and preferably in series with the pilot wire circuit, is a resistance whose value is automatically varied so that it bears a definite relation to the demand at the particular sub-station. By this means the current flow caused by the voltage impressed on the pilot wire circuit is so regulated that it always bears a definite relation to the total demand on the D. C. sources, and we may, therefore, indicate this demand on suitably calibrated current-measuring instruments. Considered in another way, my invention comprises a pilot wire circuit connecting a plurality of resistances, each of which is varied in a definite relation to the variations in the demand on the source with which it is associated, and means for measuring the total resistance of the circuit.

In order that my system shall be effective not only for indicating the total demand of power, but also for limiting the same, I provide means for varying the direct current voltage at which power is supplied to the distribution systems. It will readily be seen that, if the voltage of the distribution systems is decreased, it will be impossible for the power-using devices to draw as much power through the sub-station as previously. By this means the total demand may be limited. Any convenient means for varying the direct current voltage may be provided, and since the variations of current in the pilot wire circuit bear a definite relation to the variations of the total demand of the system I prefer to provide current responsive devices at each source, which shall control means for varying the direct current voltage at that source. If motor generator sets are used as transforming apparatus at the sub-stations the direct current voltage may be conveniently controlled by varying the excitation of the generators.

In the preferred form, the source of constant voltage applied to the pilot wire circuit will comprise a motor generator set controlled by a voltage regulator. The automatically varied resistance in the pilot wire circuit will consist of a rheostat connected to a wattmeter which measures the power demand on the particular source, and the current responsive device will consist of a contact-making ammeter. This ammeter will in turn control a motor-operated rheostat in the field circuit of the direct current generators.

For convenience of description, I shall hereafter consider that my system has been applied to a railway system supplied with power through sub-stations, and in which the train despatcher's office forms the point of control and indication for the system. I have accordingly so illustrated my system in the accompanying drawing, in which Figure 1 shows diagrammatically the apparatus employed at one sub-station and at the train despatcher's office, together with the associated pilot wire circuit, while Fig. 2 shows diagrammatically the pilot wire circuit together with the basic elements of the apparatus located at both the train despatcher's office and the sub-stations along the line.

Figure 2:
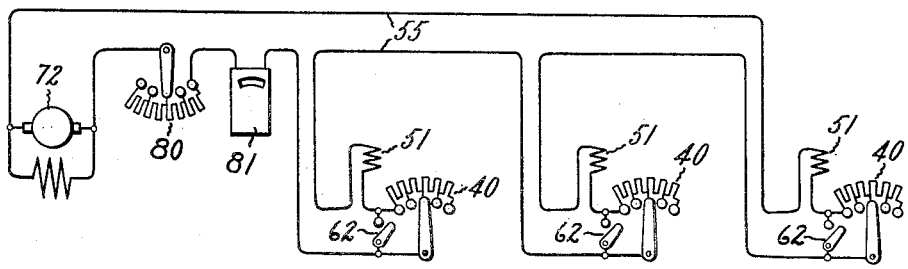

Referring to Fig. 1, it will be seen that the apparatus in the sub-stations will usually comprise incoming lines 10 from the source of electrical energy and the usual step-down transformers 11 and the switches 12, through which power is supplied to a motor generator set 20. This set is here illustrated as comprising a motor 21 and two generators 22 arranged in series, each of which is provided with the usual field winding 23 and control rheostat 24. Mounted on the same shaft I have shown an exciter 25 and an auxiliary generator 26. Energy from the direct current generators 22 is led to the positive and negative buses 30 and 31. I have also shown a connection 32 leading to the track rails, and it will be understood that the positive bus 30 is connected to the trolley or the third rail.

Associated with each sub-station and in series with a pilot wire circuit 55 is an automatically operated rheostat 40 which is moved so that the resistance in circuit is varied in a definite relation to the variations in the power supplied by the sub-station. To this end I have illustrated the rheostat arm as directly controlled by a wattmeter whose windings comprise a potential winding 41 and a current winding 42. Connected between the positive and negative buses is a high resistance shunt 43, and the potential winding is connected across a suitable portion of this shunt. Between the negative bus and track rails is a low resistance shunt 44, and the current winding 42 of the wattmeter is preferably connected across this shunt.

For the purpose of limiting the power demand on the sub-station, I supply a current responsive device which may comprise a contact-making ammeter 50, having windings 51 and 52, which aid each other. Winding 51 is in series with the pilot wire circuit 55. The other winding 52 is connected in shunt with a suitable portion of the shunt 44, through which the total current supplied by the station is flowing. This current responsive device is arranged in any desired manner to control the fields of the direct current generators 22. To this end I have shown a motor-operated rheostat 60 whose motor is provided with opposing fields whereby it will be driven in one direction or the other as the contact-making ammeter touches its upper or lower contact. The moving arm of the ammeter is normally held by the spring against the upper contact and is only drawn down so as to touch the lower contact and thereby drive the motor so as to increase the resistance of rheostat 60 when the combined currents in windings 51 and 52 exceed a certain value. Current for operating this motor may be conveniently supplied from the auxiliary generator 26. In circuit with the contact of the ammeter leading to that field of the motor-operated rheostat which tends to drive the device in a direction to add resistance in the generator fields, I have provided a relay 61, arranged in parallel with winding 52 of the contact-making ammeter, and so designed that this circuit may only be closed when the current output of the substation has attained a certain value. For a purpose to be later explained, a calibrating switch 62 is so located that it will short circuit the rheostat 40.

As has been previously explained, the pilot wire circuit 55 is a closed circuit joining the substations and leading to any point at which it is desired to indicate the total demand upon the various sources of energy, and I have, therefore, shown the apparatus, which, for convenience of explanation, we may consider to be located at the train despatcher's office, in the upper left-hand corner of Fig. 1. This apparatus comprises a source of constant potential, and in the preferred form the latter consists of a motor generator set 70, whose motor 71 is supplied with power from any convenient source, and which comprises two generators 72 arranged in series. In order to hold constant potential on the generators, I will preferably provide a voltage regulator, here indicated at 73, as of the Tirrill type, and arranged to short circuit a resistance 74 in series with the field windings 75 of the generators.

In order that I may compensate the variations in outside temperature, and consequent changes in the resistance of the pilot wire circuit 55, I have shown a calibrating rheostat 80, which will also be conveniently located at this office, and the operation of which will be later described. Since the variations of current in the pilot wire circuit bear at all times a definite relation to the variations of total power supplied by the plurality of sources, an ammeter 81 of any desired type will, if properly calibrated, indicate the kilowatt output of the substations. In order that it may be readily determined whether either side of the pilot wire circuit has become grounded, I have shown herein a device 82, operating as a ground detector. This will preferably comprise a balanced relay 83, arranged with a coil in each branch of the pilot wire circuit. The intermediate point between the generators 72 will be grounded, and it will then be possible, by the provision of suitable alarms 84 and a local battery 85, to at once determine whether there is a ground on this pilot wire circuit.

The operation of my system will be more readily understood by reference to Fig. 2, in which the pilot wire circuit 55 and its associated apparatus have been diagrammatically shown. It will be understood that the source of potential 72, the calibrating rheostat 80, and the ammeter 81 are conveniently located at the train despatcher's office, while each of the rheostats 40 and the associated winding 51 and calibrating switch 62 are each located at independent substations which may be interconnected only by the pilot wire circuit.

Supposing, although this is not necessarily the case, that the resistances of the rheostats 40 are so designed that when the rheostats at all the substations are set with approximately half of the resistances in circuit, the current flow in the pilot wire circuit will indicate zero output on the instrument 81, it is now only necessary that these resistances be varied in a definite relation to the variations in the power supplied by each individual substation, so that as the power output of any particular substation increases, the resistance of its rheostat 40 will preferably be correspondingly decreased, and a variation in the flow of current in the pilot wire circuit will result which will bear a definite relation to this change in output. A properly calibrated current measuring instrument will then indicate the total demand on the system. If the railway apparatus is suitably arranged for regeneration, a reversed flow of power may take place and the resistances will be correspondingly increased in a similar manner.

As we have already seen, it is possible to limit the demand on the substations by limiting the voltage of their direct current generators, and, accordingly, it will be seen that if the current in the pilot wire circuit exceeds a certain definite value, thus indicating an excessive total demand, the current responsive device will be actuated to energize the motor-operated rheostat, and decrease the excitation of the generators, and thereupon to regulate the D. C. voltage until the excessive demand has ceased. Since, however, the variations of current in the pilot wire circuit bear a definite relation to the variations of the total load, it will act equally upon all substations, regardless of whether they be heavily or lightly loaded. For this reason, the additional winding 52, placed in multiple with the shunt 44, is provided to assist the winding 51, so as to decrease the excitation most quickly at the substation which is heavily loaded. As a further precaution and means of accomplishing a similar result, I have also provided the relay 61, whereby the current responsive device 50 cannot operate to decrease the excitation of the generators until the current output of the substation attains a certain definite value sufficient to close the relay 61. As can be readily seen, this also serves to prevent the excitation from being decreased at a substation if it is lightly loaded, even though the total load has exceeded the desired value.

Inasmuch as the accuracy of the indications of total load by means of the instrument 81 is affected by any variations in the resistance of the pilot wire circuit, which may be as much as two hundred miles long, it will be seen that it is important to be able to calibrate for changes in temperature. I have, therefore, provided the calibrating switches 62 and the calibrating rheostat 80. By closing the switches 62, the rheostats 40 will be short circuited, whereupon the resistance of the pilot wire circuit may be measured and the rheostat 80 adjusted to bring this resistance to the normal value.

I have already described automatic means for limiting the total load on the system, but it should be noted that manual control from the train despatcher's office is possible by manipulation of the rheostat 80 or by adjustment of the setting of the regulator 73 to thereby vary the voltage impressed on the pilot wire circuit.

While I have shown and described herein one particular embodiment of my invention as it would preferably be applied in one particular case, it will be understood that I do not desire to be in any wise limited thereby, for I conceive that my invention is of broader application, and that many modifications of the particular apparatus employed would be readily evident to one skilled in the art.

What I claim as new and desire to secure by Letters Patent of the United States, is:—

1. A power indicating system for a plurality of sources of energy comprising a circuit, a source of current for said circuit, and means associated with each source of energy for varying the current in said circuit in a definite relation to the variation in the energy delivered by the respective sources.

2. A power indicating system for a plurality of sources of energy comprising a closed circuit associated with said sources, a source of current for said circuit, and means associated with each source of energy for varying the current in said circuit in a definite relation to the variations in the energy delivered by the respective sources.

3. A power indicating system for a plurality of sources of energy comprising a closed circuit associated with said sources, means for impressing a constant potential on said circuit, and means associated with each source for varying the current in said circuit in a definite relation to the variations in the power delivered by the respective sources.

4. A power indicating system for a plurality of sources of energy comprising a closed circuit associated with said sources, resistances in series with said circuit and associated with each source, means associated with each source for varying the corresponding resistance in a definite relation to the variations in the power delivered thereby, and means for measuring the total resistance of said circuit whereby the power delivered may be determined.

5. A power indicating system for a plurality of sources of energy comprising a closed circuit associated with said sources, means for impressing a constant potential on said circuit, resistances in series with said circuit and associated with each source, means associated with each source for varying the corresponding resistance in a definite relation to the variations in the energy delivered, and means for measuring the current in said circuit.

6. A power indicating system for a plurality of sources of energy comprising a closed circuit associated with said sources, a source of current in said circuit, resistances associated with each source, and means associated with each source for varying the corresponding resistance in a definite relation to the variations in the energy delivered by said source, and means for measuring the current in said circuit.

7. A device for substantially simultaneously controlling the power output of a plurality of sources of energy comprising a pilot circuit associated with said sources, current responsive means in said circuit, means governed thereby for regulating the output of each source, and means for controlling the magnitude of the current in said circuit in accordance with the power output of said sources.

8. A device for substantially simultaneously controlling the power output of a plurality of sources of energy comprising a pilot circuit associated with said sources, means associated with each source for controlling its output, means associated with each source for controlling the magnitude of the current in said pilot circuit in a definite relation to the output of the source, said means being connected in series with one another in said circuit.

9. A device for limiting the total power output of a plurality of sources of direct current comprising a pilot circuit associated with said sources, means for varying the current in said circuit in a definite relation to the variations in the sum of the outputs of the various sources, and current responsive means in said circuit for decreasing the direct current voltage when the current exceeds a fixed limit.

10. A device for limiting the total power output of a plurality of sources of direct current comprising a pilot circuit associated with said sources, means for varying the current in said circuit in a definite relation to the variations in the sum of the outputs of the various sources, current responsive means is said circuit for decreasing the direct current voltage when the current exceeds a fixed limit, and a manually adjustable resistance in said circuit.

11. A device for substantially simultaneously controlling the power output of a plurality of sources of energy comprising a pilot circuit associated with said sources, current responsive means in said circuit, means governed thereby for regulating the output of each source, resistances in said circuit, and means for controlling the current in said circuit in a definite relation to the variations in the total power delivered by said sources by varying said resistances in a definite relation to the variations of the outputs of the individual sources.

12. A device for substantially simultaneously controlling the power output of a plurality of sources of energy each of which includes a dynamo-electric generator comprising a pilot circuit associated with said sources, current responsive means in said circuit, means governed thereby for regulating the output of each source by regulating the terminal voltage of its generator, and means responsive to the output of each source for individually controlling the current in said circuit.

13. A power limiting device for a plurality of sources of direct current comprising a pilot circuit associated with said sources, means for controlling the magnitude of the current in said circuit in a definite relation to the variations in the power delivered by each of said sources, current responsive means in said circuit, and means governed thereby for regulating the direct current voltage of said sources.

14. A power limiting device for a plurality of sources of direct current comprising a pilot circuit associated with said sources, means for controlling the current in said circuit in a definite relation to the variations in the total power delivered by said sources, current responsive means in said circuit, and means governed thereby for regulating the direct current voltage, said current responsive means being also controlled by the current output of each source.

15. A device for limiting the total power output of a plurality of sources of direct current comprising a pilot circuit associated with said sources, means for varying the current in said circuit in a definite relation to the variation in the sum of the outputs of the various sources, current responsive means in said circuit associated with each source for decreasing the direct current voltage when the current in the pilot circuit exceeds a fixed limit, and means whereby the voltage is decreased most rapidly at the most heavily loaded source.

16. A device for limiting the total power output of a plurality of sources of direct current comprising a pilot circuit associated with said sources, means for varying the current in said circuit in a definite relation to the variation in the sum of the outputs of the various sources, current responsive means in said circuit associated with a source for decreasing the direct current voltage when the current in the pilot circuit exceeds a fixed limit, and means whereby the action of said current responsive means is dependent on the output of the associated source.

17. A device for substantially simultaneously controlling the output of a plurality of sources of energy comprising a pilot circuit associated with said sources, a source of current in said pilot circuit, means comprising a coil in series with said circuit arranged to regulate the output of each source, a resistance associated with each source and connected in series with said circuit, and means for regulating the magnitude of said resistances in a definite relation to the variations in the output of the associated sources.

In witness whereof, I have hereunto set my hand this 26th day of October 1914.

JOHN B. TAYLOR.

Witnesses:
 HELEN ORFORD,
 MARGARET E. WOOLLEY.